MULTI-MODE MEMORY AND DISPLAY SYSTEM

Filed March 9, 1965

2 Sheets-Sheet 1

INVENTOR
FLAVIUS A. MATHAMEL

BY Frank W. Barnes

AGENT

INVENTOR
FLAVIUS A. MATHAMEL
BY Frank W. Barnes
AGENT 3,373,419
MULTI-MODE MEMORY AND DISPLAY SYSTEM Flavius A. Mathamel, Allen Park, Mich., assignor to Burroughs Corporation, Detroit, Mich., a corporation of Michigan Filed Mar. 9, 1965, Ser. No. 438,293
17 Claims. (Cl. 340—324)

ABSTRACT OF THE DISCLOSURE

A multi-mode information memory and display system having a plurality of modules respectively including an indicator lamp and a gate controlled rectifier connected in series to a common bus. Pulsating and steady mode control currents are selectively gated individually or in combination, to the common bus to respectively operate the lamp in a visual indication mode and the gate controlled rectifier in a storage mode. Data signals applied to the gates of the controlled rectifiers determine the particular modules which are activated.

This invention relates to a multi-mode memory and display system and more specifically to such a system wherein the mode of operation of the system is dependent upon the magnitude and continuity of voltage.

In modern day data processors, it is often desirable and/or necessary to visually display and store the contents of a data processor. Many times, however, it is desirable to only store information for visual display at a later point in the operational sequence. On the other hand, in some applications, it is desirable to visually show instantaneously the contents of a section of the data processor without storage of these values in the display unit.

Heretofore, the accomplishment of these desirable functions has necessitated the use of numerous relays, flip-flops and complex circuitry. Such arrangements were not suitable for rapid operation, were bulky and cumbersome, contained moving parts which presented a maintenance problem with inherent possible failure and in general were not adapted for many applications where smallness of size and dependability were vital factors. In addition, it will be appreciated that the manufacture of devices of this nature was costly and time-consuming.

It is, therefore, an object of this invention to reduce the size and complexity of multi-mode memory and display systems.

It is an additional object of this invention to provide memory and display apparatus having a plurality of selectable operational modes.

It is a further object of this invention to provide a rapidly operating multi-mode memory and display system having no moving parts.

In carrying out the above-mentioned objectives, applicant's invention comprises a plurality of memory and indicator modules connected in parallel to a common bus to which pulsating DC potential and filtered DC potential may be selectively applied either individually or in combination. Each module is responsive to said pulsating DC potential, filtered DC potential, or both at a selectable or predetermined point in a data processor operation to visually display, store, or both, respectively, a signal from the data processor. Each module comprises current responsive visual indicating means in combination with voltage magnitude and continuity sensitive memory means.

A feature of this invention is a dual power supply which selectively applies pulsating DC potential and filtered DC potential, either individually or in combination to the common bus, in response to signals from the data processor.

The novel features of the invention, as well as the invention itself, both as to its organization and method of operation, will best be understood from the following description when read in connection with the accompanying drawings in which.

Figures 1, 2:
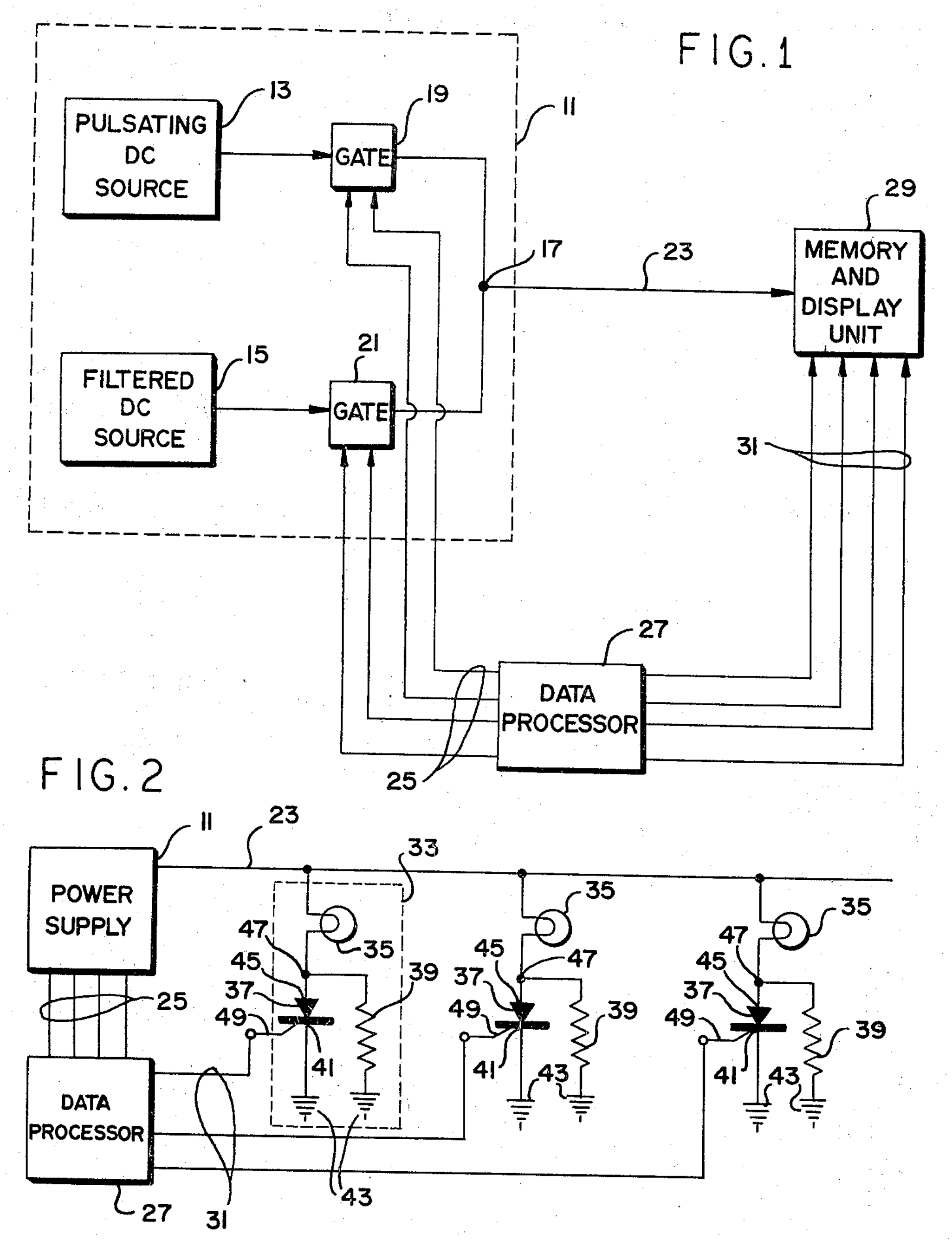
FIG. 1 is a block diagram of applicant's multi-mode memory and display system shown in a data processor application.
FIG. 2 is a schematic representation of applicant's memory and display modules shown in a system configuration.

As shown in FIG. 1, a power supply 11 is connected to a common bus 23. Power supply 11 consists of a source of pulsating DC potential 13 and a source of DC filtered potential 15 which are selectively connected to a common terminal 17 through gates 19 and 21, respectively. Common terminal 17 is in turn connected to common bus 23. A plurality of control signals 25 are selectively applied to gates 19 and 21 by data processor 27. A memory and display unit 29 is connected to the common bus 23 and its operation is controlled by other signals 31 from the data processor 27.

In operation, the control signals 25 from data processor 27 selectively energize the gates 19 and 21, thereby impressing pulsating DC or filtered DC waveforms or a composite thereof upon common bus 23. These waveforms are used in combination with other control signals 31 from the data processor 27 to the memory and display unit 29 to selectively give visual indications and electronic data storage either individually or in combination.

FIG. 2 depicts a plurality of individual modules 33 which comprise the memory and display unit 29 shown in block form in FIG. 1. Each individual module 33 comprises visual indicating means such as an incandescent lamp 35 in series with voltage magnitude and continuity responsive memory means such as a silicon controlled rectifier (SCR) 37 having a bleeder resistor 39 in parallel therewith. An SCR has anode, cathode, and gate electrodes and is somewhat similar to an ordinary rectifier which has been modified to block until a small signal of the proper polarity and magnitude has been applied to the gate electrode. After this gate signal is applied the SCR conducts in the forward direction and will continue to conduct even after the gate signal is removed. It is similar to a gas thyratron except that the forward drop across the SCR is about 1/10 that of a thyratron. In order to turn off an SCR it is necessary either to change the polarity on the anode or the cathode by external means or to allow the potential on both the anode and the cathode to equalize.

As shown in FIG. 2, the cathodes 41 of each of a plurality of SCR's 37 are connected to a common reference potential 43, such as ground. The anodes 45 are connected in series with the incandescent lamps 35, said series circuit having a common junction 47 with one end of said bleeder resistor 39, the other end of said resistor 39 being connected to reference potential 43. The size of bleeder resistor 39 is selected so that the total impedance derived from said resistor 39 and the filament of said incandescent lamp 35 is of such a magnitude that the current flow through the filament of said lamp 35 is high enough to warm the filament but below the illumination threshold. The gate electrodes 49 of SCR's 37 are connected to receive control signals 31 from said data processor 27. All the individual modules 33 are connected in parallel to the common bus 23 with said common bus 23 being connected to the power supply 11 which will be described more fully hereinafter.

It should be pointed out that a number of illuminating devices such as neon lamps and fluorescent lamps may be utilized in place of the incandescent lamp which was shown simply for means of illustration. It will be understood by one skilled in the art that minor wiring changes will be necessary so that the neon or fluorescent lamps could be inductively coupled vice directly coupled, as shown. As is also apparent, the bleeder resistor 39 may be removed without altering the operation of the circuit. Its primary function is to allow a small amount of current to flow through the lamp filament so as to reduce or prevent thermal shock as the lamp is turned on and off. In addition, any electronic gating device such as a thyratron, a trigistor or a transwitch may be utilized in place of the SCR 37 which has the characteristic of remaining on after removal of the gate signal while still being responsive to changing potentials applied to its current carrying electrodes.

Figure 3:
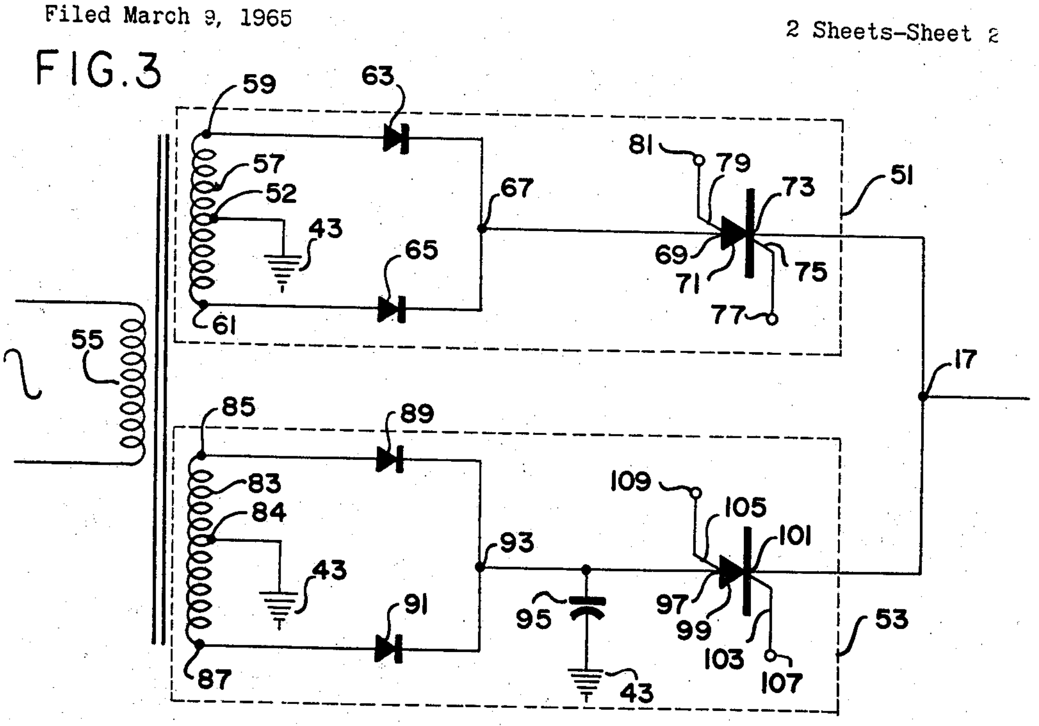
FIG. 3 is a schematic representation of applicant's novel power supply.

FIG. 3 is a detailed schematic representation of a unique power supply with particular utility in applicant's invention, providing pulsating DC and filtered DC voltage as shown in block form 11 in FIG. 1. In the embodiment of FIG. 3 the power supply includes two sections 51 and 53 having a common primary transformer winding 55 connected to a source of AC potential.

The first section 51 is a full wave unfiltered rectifier and utilizes a center tap secondary transformer winding 57 having the center tap 52 connected to a source of reference potential 43, and end terminals 59 and 61 individually coupled by diodes 63 and 65, respectively, to a common terminal 67. This common terminal 67 is connected to the anode 69 of silicon controlled switch (SCS) 71. A silicon controlled switch is similar to an SCR with the addition of a second gate electrode which permits the application of an external signal for turning off the device. The cathode 73 of SCS 71 is connected to common junction 17. On gate electrode 75 is connected to terminal 77 while off gate electrode 79 is connected to terminal 81. Control signals 25 from data processor 27 may be applied to terminals 77 and 81.

The second section 53 is a full wave filtered rectifier and is similar to the hereinabove described first section 51. Second section 53 also utilizes a center tap secondary transformer winding 83 having the center tap 84 connected to a source of reference potential 43, and end terminals 85 and 87 individually coupled by diodes 89 and 91, respectively, to a common terminal 93.

A filter capacitor 95 is connected between said common terminal 93 and reference potential 43. Common terminal 93 is also connected to the anode 97 of SCS 99. The cathode 101 of SCS 99 is connected to common terminal 17. The on and off gate electrodes 103 and 105 have terminals 107 and 109, respectively, to which may be applied the control signals 25 from data processor 27.

The center tap secondary transformer winding 83 differs from the center tap secondary transformer winding 57 in that the latter has a significantly greater number of turns than the former.

In this configuration, the first section 51 is a full wave unfiltered power supply and furnishes in the order of 95% of the power available on common bus 23. The filtered low voltage supply or second section 53 provides only a few milliamperes of DC current to the common bus 23.

Although applicant has specified full wave rectifiers, it should be pointed out that half wave rectifiers may be employed equally well without departing from the scope of the invention.

As will be apparent to one skilled in the art, there are a number of equivalents which may be substituted in the power supply for the SCS's 71 and 99. Examples include utilization of SCR's which would become back biased by the interaction of the two power supplies and thereby turned off when the control signals 25 were removed from the gate electrodes. More positive control could be accomplished by the addition of a shunting transistor in parallel with said SCR's. This type switch could also be controlled by signals from the data processor. Another example would be the use of a solenoid operated switch wherein both directions of movement of the solenoid could be controlled by the data processor.

Figure 4A:
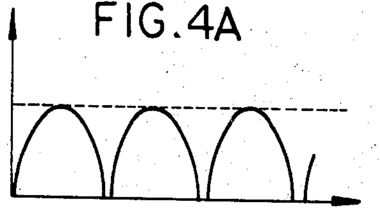
FIG. 4A represents a typical waveform generated by the unfiltered full wave rectifier.
Figure 4B:
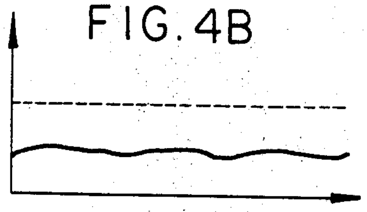
FIG. 4B represents a typical waveform generated by the filtered full wave rectifier.

In operation, when only SCS 71 is conducting, the voltage waveform impressed across the common bus 23 is similar to that depicted in FIG. 4A. When only SCS 99 is conducting, the voltage waveform impressed across the common bus 23 is similar to that shown in FIG. 4B. The amount of ripple which is present is dependent upon the load and characteristics of filtering capacitor 95. Finally, when both SCS's 71 and 99 are conducting, the voltage waveform impressed across the common bus 23 is similar to that shown in FIG. 4C.

*Storage and display*

Figure 4C:
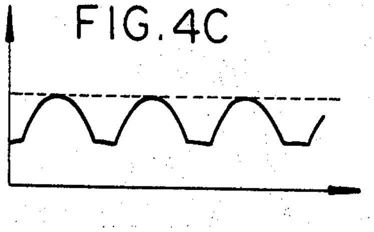
FIG. 4C represents a typical composite waveform generated by the filtered and unfiltered rectifiers when connected in parallel.

In many applications it will be desirable to utilize applicant's invention to both store and display the outputs from a data processor. In this mode of operation, both SCS's 71 and 99 are triggered into conduction by a signal from the data processor 27, thereby impressing the composite waveform as shown in FIG. 4C across the common bus 23. In such condition, the low voltage DC component of the waveform will pass through incandescent lamps 35 and bleeder resistors 39, thereby maintaining the filaments of said incandescent lamps 35 at a temperature sufficiently high to prevent thermal shock but with the voltage sufficiently low to preclude illumination.

Upon application of a control signal to gate electrode 49 of any said SCR's 37, said SCR is triggered into conduction whereby both the pulsating and filtered DC components have a direct connection to the reference potential, thereby in effect shorting out bleeder resistor 39. This marked increase in current passing through the lamp filament causes the lamp to glow brightly. The filtered DC potential prevents the SCR from being turned off by the fluctuations of the pulsating component from the unfiltered full wave rectifier 51. As shown in FIG. 4C, when both components are present on the common bus 23, the voltage realized on the bus 23 never reaches the reference potential. Therefore, the SCR's 37 will continue to conduct, and store the signal until an external signal is applied to the system.

In order to turn off the memory and indicator units 33 it is necessary only to open SCS 99 in the second section 53 by sending a control signal 25 of the proper polarity and magnitude from data processor 27 to the off gate electrode 105 of SCS 99. In this condition, the only waveform impressed across the common bus 23 is the pulsating DC component. When the line voltage alterations thereof reach zero, the SCR's 37 in the individual indicator units 33 will become back biased and thereby turned off.

Figure 5:
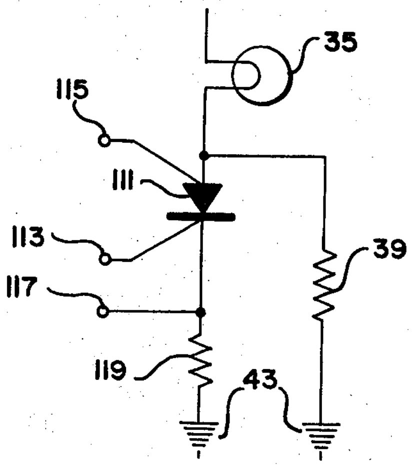
FIG. 5 is a schematic representation of another embodiment of applicant's novel memory and display modules.

In some applications it is desirable to be able to turn off individual modules 33 and this may be accomplished, as shown in FIG. 5, by the substitution of an SCS 111 for the SCR's 37. On gate electrodes 113 and off gate electrodes 115 may be connected to receive control signals 31 from data processor 27. In addition, it may be desirable to have readout means on each individual module. Also, as shown in FIG. 5, a terminal 117 and resistive means 119 are connected in series between SCS 111 and the reference potential 43. The potential realized on terminal 117 could be utilized in the data processor 27 as a verification signal when utilizing either an SCS or an SCR in the individual module. This signal, which is remote from the indivdual module, gives positive information as to whether or not the SCS or the SCR is conducting. It will be obvious to one skilled in the art that a number of combinations may be made by substituting SCS's and SCR's with or without the readout capability.

*Store without display*

In other operations it may be desirable to store outputs from a data processor for display at a later time. Such a capability may be utilized in a checking operation when it is desirable for an operator to see what is stored in the individual modules without having continuous indication and also without destroying the contents that are stored therein. In order to accomplish this mode, SCS 99 is commanded to conduct while SCS 71 is open. Therefore, the only voltage impressed across the common bus 23 is that of the filtered full wave rectifier 53 or a DC voltage. As pointed out hereinabove, this voltage is sufficent to keep the filaments of the individual indicator lamps 35 warm, but not sufficient to cause the lamps to glow brightly.

Since the potential on the common bus 23 is above reference potential, a trigger pulse applied to the gate electrode 49 of any of the individual module SCR's 37 will cause that individual SCR to conduct. This combination will continue until the DC component is removed from said common bus 23. It is obvious, of course, that an SCS may be substituted for the SCR's 37 and utilized as hereinabove described.

At any time, visual indication of the individual modules 33 may be accomplished by triggering SCS 71 into conduction. This applies the pulsating DC component to the common bus 23, thereby providing sufficient potential to illuminate the lamps. Illumination may be terminated without destroying the information contained in each individual memory unit by simply triggering off gate electrode 79 of SCS 71 with a signal of proper potential.

In order to completely erase the information stored in the individual modules, off gate electrode 105 of SCS 99 is energized by a signal from the data processor 27 and, as pointed out hereinabove, the only waveform then impressed across the common bus 23 is the pulsating DC component. When the line voltage alterations thereof reach zero, the SCR's in the individual modules will become back biased and thereby turned off. In addition, the information stored in an individual module may be erased by application of a signal to off gate electrode 115 of SCS 111 if such a device was in use.

*Display without store*

In some applications it is desirable to instantaneously display the contents and/or output of a data processor without storing these values in the display unit. This mode of operation may be accomplished in applicant's invention by triggering SCS 71 into conduction. This impresses the full wave rectified voltage on the common bus 23.

In order to make an individual module indicate, a signal of proper polarity is applied to the gate electrode 49 of that unit's SCR 37. The SCR will then conduct as long as the trigger pulse is present at gate electrode 49 and until the line alterations on the common bus reach zero after the trigger pulse has been removed.

*Conclusion*

Applicant has provided a simple, fast and versatile multi-mode memory and indicator system in which the mode of operation as to a given element may be selected by the energization of either or both of a pair of electronic switches.

While in this description three methods of employing applicant's new multi-mode memory and display system have been described, it should be noted that the scope of this invention includes various other changes and modifications that are within the skill of those familiar with the art, the scope of the invention being limited only by the following claims.

I claim:

1. A digital information memory and display unit comprising, a common bus, a dual power supply having pulsating DC and steady filtered DC outputs gatably connected, individually or in combination, to said common bus, multi-mode modular means coupled to said common bus and selectively responsive to said pulsating DC and steady DC outputs for respectively visually indicating and electronically storing information, digital information signal means for selectively activating said modular indicating and storing means, and signal means for controlling the gating of said pulsating DC and steady DC outputs to said common bus to select the mode of operation of said multi-mode indicating and storing means.

2. A multi-mode digital information memory and display unit comprising, first rectifier means for generating a pulsating output signal, second filtered rectifier means for generating a steady DC output signal, a common bus, gating means for selectively connecting said first and second rectifier output signals to said common bus, means coupled to said common bus and being selectively responsive to said pulsating and said steady DC output signals for visual indication and electronic storage, respectively, of selected digital information, and signal means for selectively enabling said visual indication and storage means and for controlling said rectifier gating means to select the mode of operation of said multi-mode memory and display unit.

3. The device in claim 2 wherein said gating means comprises a pair of gate controlled switches having main current carrying input and output electrodes and at least one control electrode, said input electrodes being connected respectively to said first and second rectifier output signals, said output electrodes being connected to said common bus, and said control electrodes being connected to said signal means.

4. The device in claim 2, said visual indication and storage means including a plurality of modules connected in parallel to said common bus, each module having a current level responsive indicator lamp and a continuity responsive memory element connected in a series current path between said common bus and a reference potential, said memory element having gate control input means responsive to said signal means to activate said memory element and thereby complete said series current path, said first rectifier pulsating output signal being operable to render said memory element cyclically conducting and to illuminate said series connected indicator lamp when said memory element is activated by said signal means, and said second rectifier steady DC output signal being operable to pass a low level non-illuminating current through said indicator lamp and to render said series connected memory element continually conducting when said memory element is activated by said signal means.

5. The device in claim 4 wherein said memory element in each of said modules comprises a silicon controlled rectifier having a pair of main current carrying electrodes connected in said series current path with said indicator lamp.

6. The device in claim 5 wherein said indicator lamp in each of said modules is an incandescent lamp having a filament connected in said series current path.

7. The device in claim 6 including resistive means connected in parallel with each of said silicon controlled rectifiers for maintaining a low level non-illuminating current through said incandescent lamp filament when said silicon controlled rectifier is not conducting.

8. A memory and display unit comprising,
- a power supply including a source of pulsating D.C. potential and a source of steady filtered D.C. potential,
- a common bus,
- means for selectively applying said sources of pulsating D.C. potential and steady filtered D.C. potential to said common bus,
- a plurality of multi-mode modules connected in parallel to said common bus, each of said modules including a voltage sensitive indicator lamp and a continuity sensitive gated memory element responsive to said pulsating D.C. and steady D.C. potentials, respectively, and
- signal means for controlling said potential source applying means to select the mode of operation of said modules and for controlling said gated memory elements to select the individual modules in which information from a data processor is to be stored and/or displayed.

9. A multi-mode memory and display unit comprising,
- a primary transformer winding,
- first and second center tapped secondary transformer windings coupled to said primary winding, said secondary windings having end terminals and means for connecting said center taps to a source of reference potential, said first secondary transformed winding having more windings than said second secondary,
- first and second common terminals,
- a first pair of diodes individually coupling said first secondary transformer winding end terminals and said first common terminal,
- a second pair of diodes individually coupling said second secondary transformer winding end terminals and said second common terminal,
- filtering means for interconnecting said second common terminal and a reference potential,
- a third common terminal,
- gating means for interconnecting, both individually and in combination, said first and second common terminals and said third common terminal,
- a common bus connected to said third common terminal,
- a plurality of memory and indicator modules connected in parallel to said common bus, each of said modules having an indicator lamp, and voltage magnitude and continuity sensitive memory means in series with said indicator lamp and a reference potential, and
- signal means, controlling said memory means and said gating means for selecting the mode of operation of said modules and the particular modules in which information from a data processor is stored in said multi-mode memory and display unit.

10. The device in claim 9 wherein said gating means comprise a pair of silicon controlled switches.

11. The device in claim 10 wherein said voltage magnitude and continuity sensitive memory means comprises a silicon controlled rectifier.

12. A multi-mode memory and display unit comprising,
- a common bus,
- a dual power supply having a pulsating output signal and a continuous filtered D.C. output signal, said power supply including controllable means for gating said output signals, individually or in combination, to said common bus, and
- a plurality of modules coupled in parallel to said common bus, each of said modules including means for visually indicating said pulsating output signal in a first mode of operation and for electronically holding said steady D.C. output signal in a second mode of operation, each of said modules having input means for selectively enabling said indicating and holding means in response to received information.

13. A multi-mode unit for memory and display of digital information comprising,
- dual power supply means for producing a pulsating signal and a steady D.C. signal, said power supply means including a common output and controllable means for selectively gating said pulsating and said steady D.C. signals, singly or in combination, to said common output,
- a plurality of memory and display module means operable in three different modes corresponding respectively to visual indication, storage, and combined visual indication and storage of said digital information, each of said module means including, lamp means coupled to said common output for non-illuminatingly conducting said steady D.C. signal and for illuminatingly conducting said pulsating signal, and
- storage means coupled in series with said lamp means for continually conducting said steady D.C. signal and for intermittently conducting said pulsating signal, said storage means having control input means responsive to said digital information for enabling said continual or said intermittent conduction.

14. A memory and display unit selectively operable in at least three different modes comprising,
- means connectable to a power supply for providing three mode control signals corresponding respectively to a pulsating signal, a steady D.C. signal, and a combination of said pulsating and steady D.C. signals,
- controllable means for selectively gating said three mode control signals to a common output,
- a plurality of modules respectively including indicating and storing means having a first input coupled to said common output for receiving said mode control signals, and a second enabling input responsive to digital information, said indicating and storing means having a first mode of operation corresponding to the indication of said digital information and controlled by said pulsating mode control signal, a second mode of operation corresponding to storage of said digital information and controlled by said steady D.C. mode control signal, and a third mode of operation corresponding to both the indication and storage of said digital information and controlled by said combined pulsating and steady D.C. mode control signals, and
- signal means controlling said enabling input and said gating means for simultaneously energizing selected modules in said first, second or third modes of operation.

15. A multi-mode digital information memory and display unit comprising,
- a mode control power supply including, means for generating an intermittent current, means for generating a continuous direct current, and selectively controllable means for gating said intermittent current and said continuous direct current, singly or in combination, to a common output,
- at least one module operable in three modes corresponding respectively to visual indication, storage, and combined visual indication and storage, of digital information, said module including,
  - a mode control input for receiving said intermittent current and said continuous direct current from said common output, an input for receiving digital information, a source of reference potential, and indicator lamp means and continuity sensitive electronic storage means coupled in a series current path between said mode control input and said source of reference potential, said lamp means and said storage means being respectively responsive to said intermittent current and said continuous direct current, said storage means having a control gate coupled to said digital information input for enabling said storage means and thereby completing said series current path.

16. A multi-mode memory and display unit comprising, a source of steady direct current having a predetermined low voltage, a source of pulsating current having a voltage greater than said predetermined low voltage, a common bus, means for gating said steady direct current and said pulsating current, both individually and in combination, to said common bus, a plurality of memory and indicator modules connected in parallel to said common bus, each of said modules having an indicator lamp, and voltage magnitude and continuity sensitive memory means connected in series between said common bus and a reference potential, and signal means, controlling said gating means and said memory means, for selecting the mode of operation of said modules and the particular modules in which information from a data processor is stored.

17. The memory and display unit of claim 16, said indicator lamp being operable in an illuminating mode in response to said pulsating current, and in a non-illuminating mode in response to said steady direct current, and said voltage magnitude and continuity sensitive memory means including a gate controlled rectifier, said rectifier being intermittently conducting in a non-storage mode in response to said pulsating current and continually conducting in a storage mode in response to said steady direct current.

References Cited

UNITED STATES PATENTS

| | | | |
|---|---|---|---|
| 3,209,237 | 9/1965 | Weist | 307—88.5 |
| 3,218,511 | 11/1965 | Rosenbaum | 307—88.5 |
| 3,226,601 | 12/1965 | Cramer et al. | 307—88.5 |
| 3,290,551 | 12/1966 | Cake | 315—84.6 |
| 3,307,171 | 2/1967 | Claessen | 340—324 |

JOHN W. CALDWELL, *Primary Examiner.*

NEIL C. READ, *Examiner.*

A. J. KASPER, *Assistant Examiner.*